Aug. 27, 1963 W. BREAU 3,101,637
GASKET CUTTING DEVICE
Filed June 10, 1960 2 Sheets-Sheet 1
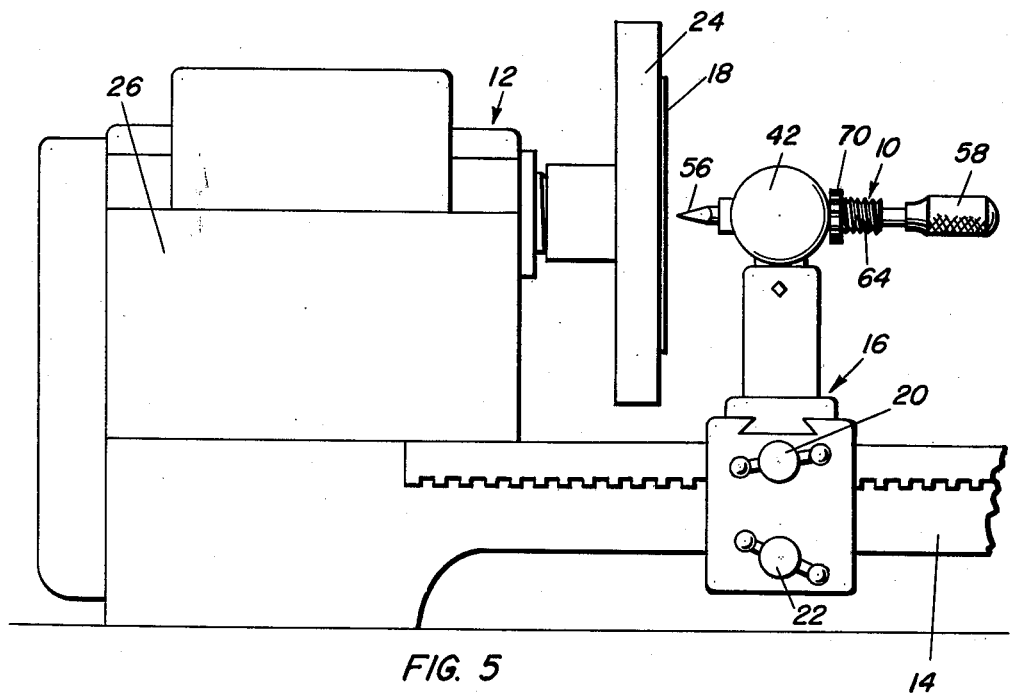
FIG. 1
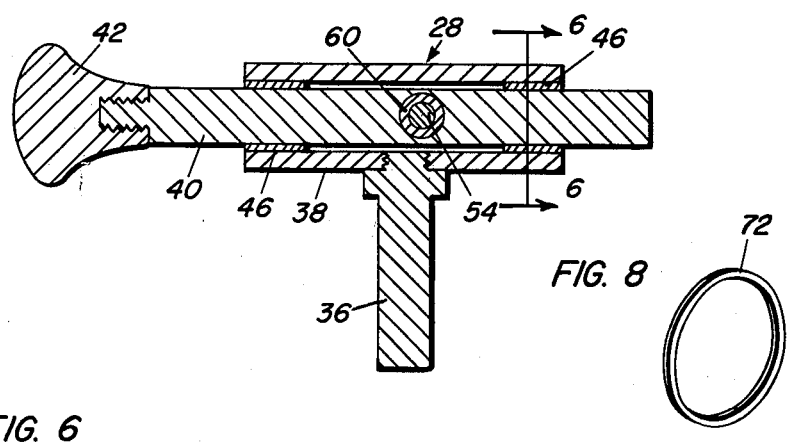
FIG. 5
FIG. 6
FIG. 8
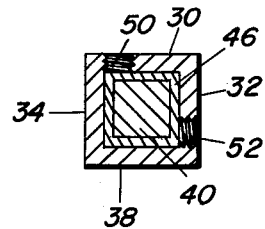
Wilfred Breau
INVENTOR.

Aug. 27, 1963 W. BREAU 3,101,637
GASKET CUTTING DEVICE
Filed June 10, 1960 2 Sheets-Sheet 2
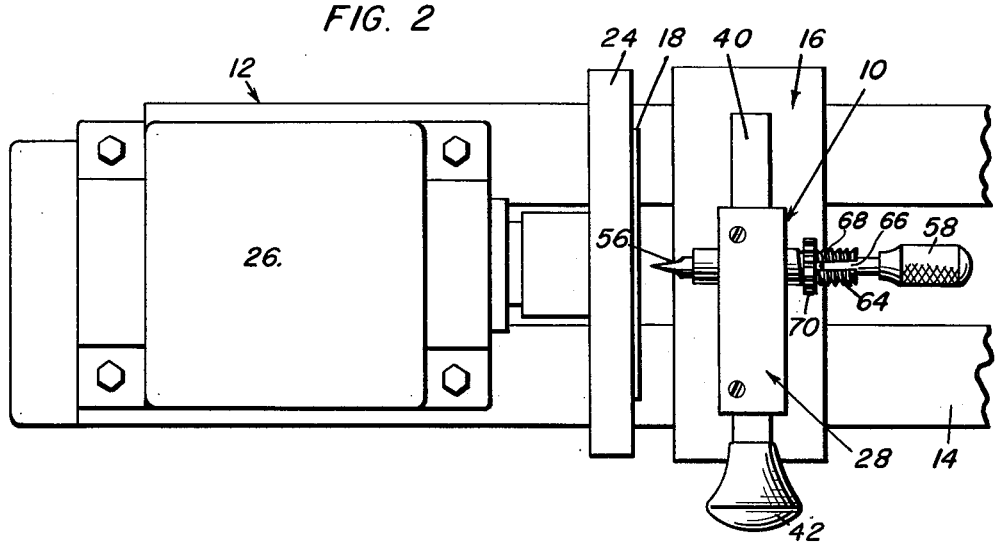
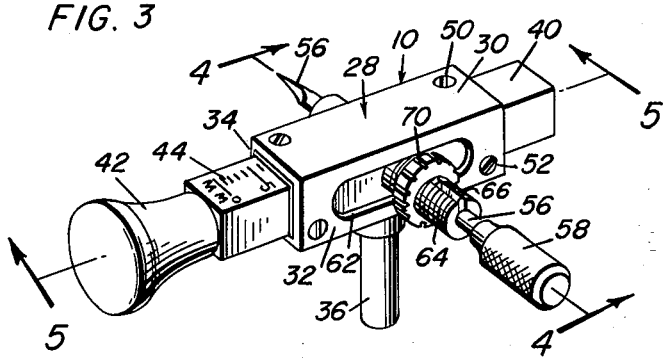
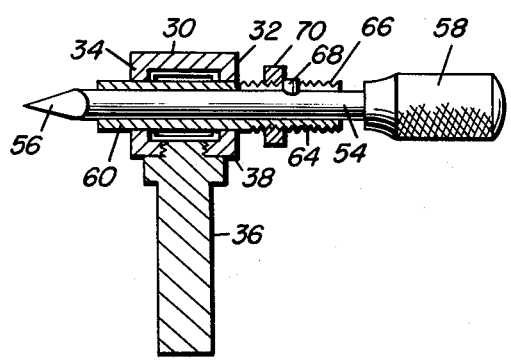
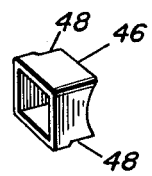
Wilfred Breau
INVENTOR.

United States Patent Office 3,101,637
Patented Aug. 27, 1963

3,101,637
GASKET CUTTING DEVICE
Wilfred Breau, Miami Beach, Fla.
(138 NE. 50th Terrace, Miami, Fla.)
Filed June 10, 1960, Ser. No. 35,250
5 Claims. (Cl. 82—24)

This invention relates to a cutting tool which is particularly adaptable for mounting on a watchmaker's lathe for cutting of plastic watch gaskets or the like.

It is therefore a primary object of this invention to provide a cutting tool for mounting on a tool holder of a lathe, said cutting tool being accurately and rapidly adjustable pursuant to the demanding requirements of the watchmaker art.

Another object of this invention in accordance with the foregoing object is to provide an adjustable cutting tool which includes a manually operable cross feed adjustment with a cross feed positioning scale so that rapid and accurate adjustment may be effected which together with an infinitely variable depth limit gauge renders the cutting tool particularly useful in the watchmaking art for the purpose of cutting parts such as waterproof plastic watch gaskets with the exacting requirements characteristic of the watchmaking art.

The adjustable tool made in accordance with this invention may be mounted on a watchmaker's lathe which includes a tool holder adjustably mounted on the lathe bed having the usual traverse and cross feed control for roughly positioning the tool holder slidably mounted on the lathe bed relative to the work mounted on a face plate type rotary chuck mounted on the rotary lathe spindle. The mounting tool made in accordance with this invention is therefore mounted on such tool holder and features the adjustable cross feed control hereinbefore mentioned as well as the depth limit gauge so that the cutting tool may be accurately and rapidly manipulated to cut work such as watch gaskets mounted on the face plate chuck.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the cutting tool device made in accordance with this invention shown mounted on a watchmaker's lathe.

FIGURE 2 is a top plan view of the arrangement shown in FIGURE 1.

FIGURE 3 is a perspective view of the cutting tool device itself.

FIGURE 4 is a sectional view taken through a plane indicated by section line 4—4 in FIGURE 3.

FIGURE 5 is a sectional view taken through a plane indicated by section line 5—5 in FIGURE 3.

FIGURE 6 is a sectional view taken through a plane indicated by section line 6—6 in FIGURE 5.

FIGURE 7 is a perspective view of one of a slide bearing sleeve.

FIGURE 8 is a perspective view of a watch gasket that may be cut by use of the cutting tool device of this invention.

Referring to the accompanying drawings, it will be observed in FIGURES 1 and 2, that the cutting tool support generally indicated by reference numeral 10 is mounted on a watchmaker's type of lathe generally indicated by reference numeral 12 including a lathe bed 14 upon which the tool holder generally indicated by reference numeral 16 is slidably and adjustably mounted in the usual and conventional manner. The lathe 12 also includes a traverse control 22 for roughly adjustably positioning the tool holder 16 toward and away from the work 18 mounted on a face plate type chuck 24 of the lathe 12. The tool holder 16 includes the usual type of cross feed control 20 for roughly positioning the tool holder 16 across the plane of the face plate chuck as will be more clearly seen in FIGURE 1. The face plate chuck 24 is rotated by means of the lathe motor or spindle drive generally indicated by reference numeral 26 in a manner well known in the art.

Referring now to FIGURE 3 in particular, it will be observed that the cutting tool support 10 includes a tubular guide member 28 which has a top side 30 interconnected with vertical sides 32 and 34. The tubular guide member 28 as illustrated is rectangular or square in cross-section and is mounted on the tool holder 16 of the lathe by means of a shank member 36 which is threadedly engaged and secured to the bottom side 39 of the tubular guide member 28 as more clearly seen in FIGURES 4 and 5.

It will be observed in FIGURES 1 and 2, that the tubular guide member 28 when inserted in the tool holder 16 is disposed parallel to the face plate chuck 24 and the work 18 mounted thereon. The tool may therefore be adjusted crosswise by means of a cross feed slide member 40. As will be more clearly seen in FIGURES 3 and 5, the cross slide member 40 has threadedly secured to one end thereof a manual control knob 42 while a caliber scale 44 is mounted on the top surface of the cross slide member 40 in any convenient manner so as to indicate the crosswise position of the tool relative to the edge of one end of the tubular guide member 28.

It will therefore be appreciated that the cross slide member 40 must be slidably disposed relative to the tubular guide member 28 with sufficient frictional contact so as to maintain the adjusted position of the slide member 40 and yet enable immediate and therefore rapid manual adjustment of the slide member 40 through the use of knob 42. Therefore, arcuate and sensitive adjustment of the sliding friction contact with the cross slide member 40 is made possible through use of slide guide bearing sleeves 46 which are mounted within the tubular guide member 28 adjacent its opposite ends as will be more clearly seen in FIGURE 5. Each of the bearing sleeves 46 has slots 48 cut into opposite corners thereof as shown in FIGURE 7 so as to render the sides of the sleeves relatively flexible. The flexible sides of the sleeves are therefore so positioned within the tubular guide member 28 so that they may be engaged by set screws 50 which are mounted on the top sides 30 of the tubular guide member 28 and with set screws 52 mounted on the side wall 32 of the tubular guide member 28 as will be apparent from FIGURES 3 and 6. Accordingly, by adjustment of the setscrews 50 and 52 the flexible sides of the bearing guide sleeves 46 may be adjusted for frictional contact with the slide member 40 with infinite and accurate control so as to meet the exacting requirement for which the cutting tool support is used.

The cutting tool itself is carried by the cross slide member 40. The cutting tool includes a shank portion 54 having a cutting knife portion 56 at one end by which the workpiece 18 may be cut. The other end of the tool shank 54 includes a knurled knob 58 which may be manually manipulated so as to move the cutting knife 56 inwardly toward the workpiece for cutting thereof.

It will be appreciated that the depth of cut of the cutting tool must be controlled. Therefore, a depth limit gauge is provided for mounting the tool shank 54 on the cross slide member 40. Referring therefore to FIGURE 4 in particular, it will be observed that a tubular support member 60 is connected to the slide member 40 and extends therethrough and also through slots 62 formed through the side walls 32 and 34 of the tubular guide member 28 for accommodating sliding movement of the tubular member 60 with the slide member 40 and to also limit such sliding movement between the ends of the slots 62. A threaded portion 64 is provided on one end of the tubular member 60 and includes a depth guide slot 66 within which an abutment projection 68 mounted on the tool shank 54 is slidably received to confine movement of the tool shank 54 to that of sliding longitudinal movement relative to the tubular member 60, see FIGURE 4. As also seen in FIGURE 4, a nut member 70 is threadedly engaged with the threaded portion 64 of the tubular member 60 for the purpose of limiting inward sliding movement of the tool shank 54 relative to the tubular member 60 and to thereby limit the depth of cutting of the tool knife or blade 56. As will be more clearly seen in FIGURE 3, the nut member 70 is knurled or otherwise roughened on its outer periphery so that it may be easily and manually manipulated or rotated so as to axially position the nut member along the threaded portion 64 by virtue of its threaded engagement therewith. Accordingly, the cutting depth may be adjustably varied as required with a high degree of accuracy.

From the foregoing description, operation and functioning of the cutting tool support will be apparent. It should of course be recognized, that various types of cutting tool blades other than the illustrated blade 56 may be used in accordance with this invention. It will also be appreciated, that the tool made in accordance with this invention, because of the accurate sliding friction control made possible by the novel sleeve construction and its position within the disclosed combination, enables manual adjustment rapidly and accurately without the use of additional measuring devices with the time consumption incident thereto to thereby render the cutting tool support of this invention highly useful in the watchmaking art. An example of the work for which the tool support is highly useful, is illustrated in FIGURE 8 which shows a plastic type of watch gasket 72 which may be cut by the cutting tool from the work stock 18, the plastic gasket 72 being of course illustrative only of the type of work for which this tool support is useful it being understood that the support is also useful by the changing of cutters for cutting of metal wherein similar exacting requirements are to be met.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cutting tool support for securement to a tool holder on a lathe having a rotatable face plate type chuck, said tool support comprising an elongated tubular guide means adapted for securement to said tool holder with said guide means disposed paralleling said face plate chuck, elongated cross feed slide means slidably disposed within said tubular guide means, adjustable friction bearing means mounted within said guide means snugly and slidably receiving said cross feed slide means for longitudinal reciprocating movement of the latter through said tubular guide means, elongated support means carried by said cross feed slide means adapted to guidingly support an elongated cutter shank for longitudinal reciprocal movement transversely of said cross feed slide means and including adjustable depth gauge means mounted on and for adjustable movement longitudinally of said support means and adapted for engagement by a portion of an abutment supported from said cutter shank for limiting movement of the shank in one direction relative to and laterally of said tubular guide means toward said face plate chuck, said adjustable friction bearing means including sleeve means slidably receiving said slide means therethrough and having a yieldable wall portion, means operatively connected between said guide means and said sleeve means for adjustably deflecting said wall portion inwardly.

2. The tool as defined in claim 1, wherein said cross feed slide means includes scale means on a sliding surface thereof cooperating with one end edge of said tubular guide means to indicate cross feed positions of the cutting tool.

3. The tool as defined in claim 1, wherein said guide means comprises a tubular member rectangular in cross-section and having slots formed in opposite sides thereof through which the support means extends for cross slide movement with the cross slide means relative to said tubular guide means, said slots being operative to limit said slide movement.

4. The tool as defined in claim 3, wherein said support means comprises a tubular member having an externally threaded portion at one end, a depth guide slot disposed through said threaded portion, said adjustable depth gauge means comprising limiting nut member threadedly engaged with said threaded portion and rotatable relative thereto for axial positioning thereof along the threaded portion adapted to be engaged by said abutment to adjustably limit slidable movement of the cutter shank inwardly toward the face plate chuck.

5. A cutting tool support for securement to a tool holder on a lathe having a rotatable face plate type chuck, said tool support comprising an elongated tubular guide means adapted for securement to said tool holder with said guide means disposed paralleling said face plate chuck, elongated cross feed slide means slidably disposed within said tubular guide means, adjustable friction bearing means mounted within said guide means snugly and slidably receiving said cross feed slide means for longitudinal reciprocating movement of the latter through said tubular guide means, elongated support means carried by said cross feed slide means adapted to guidingly support an elongated cutter shank for longitudinal reciprocal movement transversely of said cross feed slide means and including adjustable depth gauge means mounted on and for adjustable movement longitudinally of said support means and adapted for engagement by a portion of an abutment supported from said cutter shank for limiting movement of the shank in one direction relative to and laterally of said tubular guide means toward said face plate chuck.

References Cited in the file of this patent

UNITED STATES PATENTS

| | | |
|---|---|---|
| 151,471 | Carlstrom | June 2, 1874 |
| 394,111 | Garlock | Dec. 4, 1888 |
| 963,144 | Hanson | July 5, 1910 |
| 1,075,450 | Van Osdel | Oct. 14, 1913 |
| 1,092,615 | White | Apr. 7, 1914 |
| 2,333,228 | Barrett | Nov. 2, 1943 |
| 2,397,109 | Hedin | Mar. 26, 1946 |
| 2,909,082 | Booth | Oct. 20, 1959 |

FOREIGN PATENTS

| | | |
|---|---|---|
| 5,257 | Switzerland | June 22, 1892 |